United States Patent [19]

Breikss

[11] 3,736,581

[45] May 29, 1973

[54] HIGH DENSITY DIGITAL RECORDING

[75] Inventor: Ivars P. Breikss, Littleton, Colo.

[73] Assignee: Honeywell Inc., Minneapolis, Minn.

[22] Filed: July 2, 1971

[21] Appl. No.: 159,356

[52] U.S. Cl. ....................340/174.1 A, 340/174.1 H

[51] Int. Cl. ....................G11b 5/02

[58] Field of Search ....................340/174.1 A, 174.1 B, 340/174.1 H

[56] References Cited

UNITED STATES PATENTS

| | | | |
|---|---|---|---|
| 3,508,228 | 4/1970 | Bishop | 340/174.1 H |
| 3,537,084 | 10/1970 | Behr | 340/174.1 A |
| 3,623,074 | 11/1971 | Bailey | 340/174.1 H |
| 2,972,735 | 2/1961 | Fuller et al. | 340/174.1 A |

*Primary Examiner*—Vincent P. Canney
*Attorney*—Arthur H. Swanson, Lockwood D. Burton and Mitchell J. Halista

[57] ABSTRACT

A playback system for a high density digital recording carrying digital information in the form of a code composed of pulse lengths between successive zero crossings. Random variations in these pulse lengths after playback of the recorded information are compensated by converting the duration of the pulse lengths into counts of a fixed clock and, subsequently, decoding the count data into binary form by sensing a first plurality of counts for one type of binary data and a second plurality of counts for a second type of binary data. The two types of binary data are temporarily stored in respective flip-flop circuit between successive decoding operations controlled by a clock signal derived from a frequency multiplication of the input signals.

10 Claims, 2 Drawing Figures

INVENTOR.
IVARS P. BREIKSS
BY [signature]
ATTORNEY.

HIGH DENSITY DIGITAL RECORDING

BACKGROUND OF THE INVENTION

The recording and playback of digital data on magnetic tape is routinely accomplished by well known prior art circuits with the limitation that the recording density is maintained at approximately 1,000 digital bits per linear inch of the magnetic tape. However, an increase in the recording density is desirable in order to provide a more economical use of the magnetic tape as well as the tape handling equipment required to handle the amount of tape necessary to record a large number of digital bits. The recording density can easily be increased by converting the input signal into a code which contains information represented by the length of the period of a recorded waveform. Such recording techniques are also well known in the art. In the prior art high density recording system, one possible code defines a recorded "one" as a zero crossing in the center of a bit frame while a recorded "zero" is represented by the lack of a zero crossing in the center of a bit frame and zero crossings are always provided at the beginning and ends of each bit frame to define the bit frame. The recording density can, thus, be increased such that the shortest interval between the zero crossings of the recorded signal is the minimum possible within the bandwidth limitations of the recording system being used. An inherent problem of recording systems using the aforesaid method of increasing the recording density arises from the jitter, or time instability, of the zero crossings of the recorded waveforms with respect to each other because of time base errors and other imperfections of the recording process. The net effect of this jitter is a random time differential between the zero crossings of the reproduced signal when compared to the input signal. This random error in the zero crossings complicates the information retrieval process by varying the length of a reproduced output signal from the playback system. Such a random variation in the reproduced pulse duration could produce a playback error by failing to adequately differentiate between pulses representing logical "1" 's and "0" 's.

Accordingly, it is the object of the present invention to provide an improved playback system for high density digital recording.

Another object of the present invention is to provide an improved digital recording playback system for removing playback errors occasioned by random time differentials between the zero crossings of the playback signal.

SUMMARY OF THE INVENTION

In accomplishing these and other objects, there has been provided, in accordance with the present invention, a digital recording playback system having digital counters for counting fixed frequency clock signals. The input signals derived from the tape are arranged to control the selective routing of the clock signals from a clock source to the counters whereby the counters count clock pulses during the presence of a corresponding digital level of the input signals. Specifically, a first counter counts clock pulses when the input signal is a logical "1" while a second counter counts clock pulses when the input signal is a logical "zero". The output of each counter is applied to a respective count decorder. The decoders are each arranged to produce logical "1" and "0" representative output signals with each output signal being maintained for a count range within the limits represented by the anticipated random variations of the durations of the reproduced input signals. The "1" outputs are applied to a first flip-flop while the logical "0" outputs are applied to a second flip-flop to store the respective binary states of the decoded input signals.

BRIEF DESCRIPTION OF THE DRAWINGS

A better understanding of the present invention may be obtained when the following detailed description is read in connection with the accompanying drawings in which.

DETAILED DESCRIPTION

Figure 1:
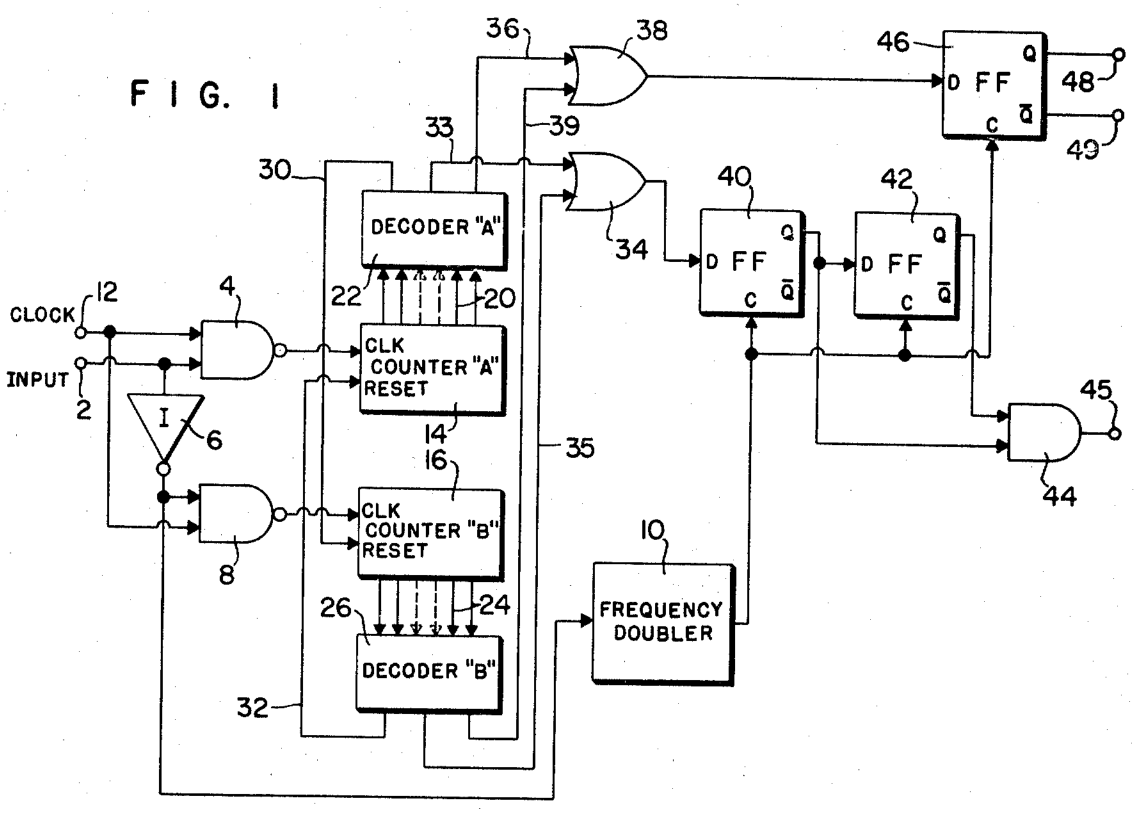
FIG. 1 is a block diagram of a digital playback system embodying the present invention.

Input signals to the digital playback system illustrated in FIG. 1 are applied to an input terminal 2. The input terminal 2 is connected to a first input of a first NAND gate 4 and to the input of a logic inverter 6. The output of the inverter 6 is connected to a first input of a second NAND gate 8 and to a frequency doubler circuit 10. A clock input terminal 12 is arranged to be connected to a source of high frequency clock pulses. The clock input terminal 12 is connected to a second input of the first NAND gate 4 and to a second input of the second NAND gate 8. An output signal from the first NAND gate 4 is applied to the clock input of a first counter 14 to be counted thereby. Similarly, an output signal from the second NAND gate 8 is applied to the clock input of a second counter 16 to be counted thereby. Output lines 20 from the count stages of the first counter 14 are connected to a first decoder 22 to apply a count signal to be converted to an output signal representative of an instantaneous count stored in the counter 14. Output lines 24 from the count stages of the second counter 16 are applied to a second decoder 26 to, also, be converted into a count-representing output signal. The decoders 22 and 26 may be any suitable circuit for providing output signals each representative of a plurality of count signals from the associated counters, e.g., a plurality of OR gates.

A first output signal from the decoder 22 representing a first, or early, count of the first counter 14 is applied along line 30 to a Reset input of the second counter 16. Similarly, a first output signal from the second decoder 26 representing a first count of the second counter 16 is applied along line 32 to a Reset input of the first counter 14. A second output from the first decoder 22 representing a second, or intermediate, count of the first counter 14 is applied as a first input to a first OR gate 34. A second input for the first OR gate 34 is obtained from a second count representing output signal from the second decoder 26 applied along line 35. A third count representing output signal from the first decoder 22 is applied as one input signal to a second OR gate 38. A second input signal for the OR gate 38 is obtained from a third count representing output of the second decoder 26 applied along line 39.

The output signal from the first OR gate 34 is applied to a "D" input of a first D-type flip-flop 40. One output side of the flip-flop 40, e.g., the logical "1" output, is connected to a "D" input of a second D-type flip-flop 42 as well as providing a first input signal to an AND gate 44. A second input signal for the AND gate 44 is obtained from a similar output, e.g., the logical "1" output, of the second flip-flop 42. An output signal from the AND gate 44 is applied to an output terminal 45. An output signal from the second OR gate 38 is applied to a "D" input of a third D-type flip-flop 46 while logical "1" and "0" outputs of the third flip-flop 46 are connected to output terminals, 48, 49 respectively. An output signal from the frequency doubler 10 is applied to the clock inputs of the first, second and third D-type flip-flops 40, 42, and 44 to energize these flip-flops in combination with the concurrent state of the input signals applied to the "D" input terminals thereof.

In operation, the apparatus of the present invention as illustrated in FIG. 1, is arranged to restore the original binary input data which was recorded on a recording medium after playback of the recording from the recording medium by producing output signals which correspond to the logical "1"'s and "0"'s in the original binary input data. The input signals to the circuit shown in FIG. 1 are an input signal from a tape playback system [not shown], which signal is applied to the data input terminal 2, and a high frequency clock signal applied to the clock input terminal 12 from a suitable source [not shown]. In a typical embodiment, the frequency of the input clock signal may be fifty times higher than the recording frequency of the digital data on the magnetic tape. This ratio is effective to produce one hundred pulses at the clock input terminal 12 for each two pulses of the original recording frequency corresponding to a data bit frame. When the data input signal to the input terminal 2 is a logical "1", the NAND gate 4 is energized to allow the clock pulses applied to the clock input terminal 12 to reach the counter 14. At the same time, the inverter 6 applies a logical "0" to one input of the second NAND gate 8 to block the clocks signals from the clock input terminal 12 from being applied to the second counter 16. Conversely, when the input to the input terminal 2 is a logical "0" the clock pulses from the clock input terminal 12 are applied to the second counter 16 through the second NAND gate 8 while the first NAND gate 4 is deenergized to block the clock pulses from reaching the first counter 14.

A early count output, e.g., a count of five, is applied from the decoders 22 and 26 along lines 30 and 32 to the reset input of the counter 16, 14 respectively. Specifically, a five count representative output signal from the first decoder 22 is applied to the reset terminal of the second counter 16 while a five count representative output signal from the second decoder 26 is applied to the reset terminal of the first counter 14.

As previously mentioned, a logical "1" in the input signal applied to the input terminal 2 corresponds to the presence of a transition or zero crossing in the middle of the data bit cell. Such an input signal is effective to energize the NAND gate 4 and to denergize the second NAND gate 8. The energization of NAND gate 4 allows a count of one-half bit cell clock pulses by the first counter 14 during the presence of the logical "1" input signal. Because of the displacement of the zero crossing, caused by various errors in the recording, a playback system, as previously discussed, system, the pulse length of a logical "1" input pulse applied to the input terminal 2 will exhibit a random variation. In order to compensate for an approximately ±32 percent variation of the pulse length defining a logical "1" to accomodate expected conventional pulses length variations, the decoders 22 and 26 are arranged to produce a second, or intermediate, count-representative output signal on output lines 33 and 35, respectively, for counts from their associated counters during a count range of 34 to 66 clock pulses. On the other hand, a logical "0" in the input signals applied to the input terminal 2 corresponds to the absence of a transition, or zero crossing in the middle of a bit cell. Such an input signal is effective to deenergize the first NAND gate 4 and to energize the second NAND gate 8 by the inversion operation of the logical "0" state by the signal invertor 6. The energization of the second NAND gate 8 allows a count of clock pulses by the second counter 16 during a full bit cell. As a result of the aforesaid variations in the displacement of the zero crossing, the compensation for an approximately ±32 percent variation in the pulse length of the pulses defining a logical "0" is provided by arranging the decoders 22 and 26 to produce a third count-representing output signal on output lines 36 and 39, respectively, for a count from their associated counters during a count range of 68 to 132 clock pulses. The second output signals from the decoders 22 and 26 representative of a logical "1" input signal are applied on lines 33 and 35, respectively, to a first OR gate 34. Conversely, the third outputs from the decoders 22 and 26 representitive of a logical "0" input signal are applied on lines 36 and 39, respectively, to a second OR gate 38. The output signal from the second OR gate 38 is representitive of the decoding of a count range in the counters 22 and 16 produced by a logical "0" input signal. The output signal from the second OR gate 38 is applied to a D-input of the first D-type flip-flop 46. The D-flip-flop is a well-known circuit in which the logical state present at the D-input is transferred to the outputs "Q" and "$\overline{Q}$" thereof by clock pulses applied to a clock input thereof. Thus, if at the time of the occurrence of the clock pulses from the frequency doubler 10, the D-input is supplied with a logical "1" input signal, the "Q" output goes to a logical "1" level, and the "$\overline{Q}$" output goes to a logical "0" level. Conversely, a logical "0" at the D-input at the time of the occurrence of the clock pulse will produce the logical states of "0" and "1" at the outputs "Q" and "$\overline{Q}$", respectively. In order for the first D-type flip-flop 46 to respond as described above, the input from the second OR gate 38 must be in the proper logic state when the clock pulse from the frequency doubler 10 arrives at the clock terminal of the flip-flop 46. Accordingly, this logic level must be maintained for the count range corresponding to the occurrence of the logical "0" at the input terminal 2. In other words, the logic level at the D-input of the first flip-flop 46 must be maintained for the count range of 100 ±32 counts. The logic states of the "Q" and "$\overline{Q}$" outputs of the first flip-flop 46 are applied to output terminals 48 and 49, respectively, with "Q" output representing a "0" input at the input terminal 2. Similarly, the D-type flip-flops 40 and 42 are controlled by the intermediate outputs of the decoders 22 and 26 via signal line 33 and 35 and the first OR gate 34. In order for these flip-flops 40 and 42 to respond to the logical state representating a logical "1" at the input terminal 2, the input to the D-input of the first D-type flip-flop 40 must be maintained in a logical "1" state during the aforesaid count range to assure that the first D-type flip-flop will be triggered when the clock pulse arrives at the clock inputs of the D-flip-flops 40 and 42 from the frequency doubler 10. Two successive logical "1'"s from the first OR gate 34 will, of course, produce a logical "1" state at the "Q" outputs of the first and second flip-flops 40 and 42. This condition is detected by the first NAND gate 44 to produce an output signal on an output terminal 45 representative of a logical "1" in the input data at the input terminal 2. Thus, the output signals appearing at the output terminals 45 and 48 are representative of "1" and "0" input signals applied to the input terminal 2, respectively, with the variations in input pulse duration having been compensated by the circuit shown in FIG. 1 whereby the output signals are accurate representations of the recorded binary data.

Figure 2:
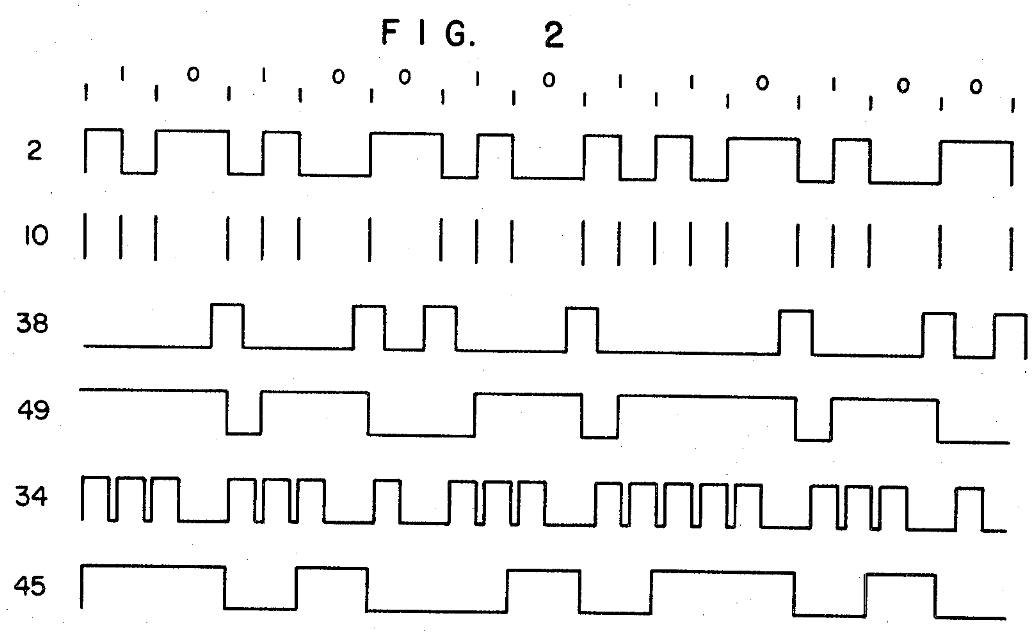
FIG. 2 is a timing diagram of the waveshapes occurring with respect to the numbered elements in the playback system shown in FIG. 1.

The waveshapes shown in FIG. 2 are representative of those occurring in the circuit illustrated in FIG. 1 and are identified by reference numbers associated with corresponding elements in FIG. 1. Thus, the "2" waveshape is the playback waveshape representative of the previously discussed coding techniques. Waveshape "10" is the output of the frequency doubler 10 which provide an output signal for each zero crossing of the input signal, i.e., two output signals for each input signal. Waveshape "38" is representative of "1" representing count over the previously discussed count range. This signal is clocked into the third flip-flop 46 by the clock signals where it appears at the output terminals 48 and 49 with waveshape "49" providing a representative example. The "0" representing count range is shown in waveshape "34" and appears at output terminal 45 as waveshape "45" for each two successive "0" input signals. The original data is restored by either detecting a single long duration or two successive short durations with either method providing satisfactory results.

Accordingly, it may be seen that there has been provided, in accordance with the present invention, an improved digital recording playback systems for compensating reproduced digital signals for random variations in playback signal duration.

What is claimed:

1. A playback system comprising:

input terminals means arranged to be connected to a source of digital input signals, clock means for producing a constant frequency clock signal having a frequency higher than the highest frequency of said digital input signals, NAND gate means having a first input connected to said input terminals and a second input connected to said clock means, said NAND gate means being arranged to selectively route said clock signals to an output of said gate means in response to said input signals, counter means connected to said output of said gate means to count said clock signals, and decoder means connected to said counter means and arranged to provide a first output signal representative of a first plurality of counts stored in said counter means and a second output signal representative of a second plurality of counts stored in said counter means.

2. A playback system as set forth in claim 1 wherein said gate means includes means for summing said input signal with said clock signals to provide an output signal from said gate means.

3. A playback system as set forth in claim 1 wherein said decoder means includes a first-flop means for storing said first output signal and a second flip-flop means for storing said second output signal.

4. A playback system as set forth in claim 1 wherein said first plurality of counts encompasses a ±32 percent range with respect to a predetermined medial count.

5. A playback system as set forth in claim 4 wherein said second plurality of counts encompasses a ±32 percent range with respect to a second predetermined medial count.

6. A playback system as set forth in claim 1 and including a second NAND gate means having a first input and a second input, said second input being connected to said clock means, logical inverter means connected between said input terminals and said first input of said second NAND gate means, said second NAND gate means being arranged to selectively route said clock signals to an output of said gate means in response to said input signals, second counter means connected to an output of said second NAND gate means to count said clock signals, and second decoder means connected to said second counter means and arranged to provide a first output signal representative of a first plurality of counts stored in said second counter means and a second output signal representative of a second plurality of counts stored in said second counter means.

7. A playback system as set forth in claim 6 wherein said second decoder means includes means to reset said first-mentioned counter means upon the attainment of a predetermined count by said second counter means and said first-mentioned decoder means includes means to reset said second counter means upon the attainment of a predetermined count in said first-mentioned counter means.

8. A playback system as set forth in claim 7 wherein said second NAND gate means includes means for summing an output signal from said inverter means with said clock signals to produce an output signal from said second gate means.

9. A playback system as set forth in claim 6 wherein said decoder means includes a first flip-flop means for storing said first output signal from said first or second decoder means and a second flip-flop means for storing said second output signal from said first or second decoder means.

10. A playback system as set forth in claim 6 wherein said first-mentioned and said second-mentioned first and second plurality of counts encompasses a ± 32 percent range with respect to a predetermined medial count.

* * * * *